United States Patent [19]

Leavell et al.

[11] Patent Number: 4,943,951

[45] Date of Patent: Jul. 24, 1990

[54] DEPTH FINDER WITH TUTORIAL

[75] Inventors: David R. Leavell, Columbus, Ga.; Earl W. Spencer, Jr., Montgomery, Ala.; Bruce L. Bacon, Columbus, Ga.

[73] Assignee: Microsonics, Inc., Columbus, Ga.

[21] Appl. No.: 380,796

[22] Filed: Jul. 17, 1989

[51] Int. Cl.$^5$ .............................................. G01S 15/96
[52] U.S. Cl. ................................... 367/111; 367/107; 367/910; 434/6
[58] Field of Search ................. 367/99, 107, 111, 112, 367/115, 910; 434/1, 6, 10

[56] References Cited

U.S. PATENT DOCUMENTS 4,597,069  6/1986  Milano et al. .................... 367/112 X

OTHER PUBLICATIONS

Eagle 3D-100, Liquid Crystal Graph; Dec. 1987, pp. 1-42; Owners Manual.
Eagle 7-7500; Cabela's, 1987, Christmas Catalog, 1 page.
Bass Pro Shops, 1988 Catalog; pp. 438-450.
The Bottom Line User Manual; 1986; pp. 1-18.

Primary Examiner—Thomas H. Tarcza
Assistant Examiner—Tod Swann
Attorney, Agent, or Firm—Jennings, Carter, Thompson & Veal

[57] ABSTRACT

A liquid crystal display depth finder using a sonar transducer is provided with a plurality of input keys interfaced to a microprocessor with each input key being dedicated to a particular function or feature usable with the depth finder. The microprocessor is utilized to control the operation of the transducer and the display of the data generated thereby in accordance with the particular function or set of functions chosen by the operator and to manipulate programming stored within the depth finder which will enable a tutorial mode comprising alphanumeric information and command key indication such that an the user may determine how the machine is to properly function.

10 Claims, 6 Drawing Sheets

DEPTH FINDER WITH TUTORIAL

FIELD OF THE INVENTION

The present invention relates to depth finders and more particularly to depth finders which use acoustic waves generated by a transducer mounted on a boat to determine the depth and bottom contour of a body of water and also to locate fish suspended in the body of water. More particularly the present invention relates to a depth finder of the type utilized by sport fishermen and in even greater particularity relates to a depth finder wherein the acoustic data retrieved by the system is displayed on a pictorial screen such as may be generated by the use of a Liquid Crystal Display (LCD). In even greater particularity the present invention may be described as a depth finder of the aforementioned type wherein a tutorial mode is employed to provide an on-screen alpha-numeric description and feature illustration presentation which allows the user to obtain assistance in the proper utilization of the depth finder.

BACKGROUND OF THE INVENTION

Over the past several years the utilization of depth finders in locating schools of fish and bottom structure has become an increasingly popular adjunct to sport fishing. The early depth finders were based on the World War II era sonar which allowed an acoustic signal to be generated and transmitted through the water, reflected by the bottom and returned to a sensing device which, in combination with electronic circuitry, was able to time the transit of the wave through the water and judge the distance of the bottom from the boat. Oftentimes these devices merely presented an indication on a circular scale that stated that the bottom was at thus and such depth and therefore it was necessary to pay close attention to the scale to determine contour of the bottom of the body of water. As these devices have progressed over the years, the state of the art has developed to the point that it is common to employ a recorded graph which automatically traces a pictorial representation of the bottom of the body of water on a strip of paper using pins or other imaging techniques with the strip of paper being retained by the operator. In these instances, of course, a permanent record of the bottom contour along a particular transit line across the water may be recorded and preserved. It will be appreciated that most fishermen do not have a need to record each transit of the body of water but rather are more particularly concerned with the submerged features of the body of water as they are moving over the body of water. This is particularly true in as much as the sensitivity of depth finders has been increased to the point where suspended objects such as fish or schools of fish may be detected by the depth finders and represented on a display screen. Therefore it is now popular to provide depth finders which have display screens such as liquid crystal displays which can give a pictorial representation of not only the bottom of the body of water but also of fish suspended above the bottom of the body of water.

The evolution of the technology has seen a corresponding evolution of the complexity of the data and information required by the fishermen. As the technology has grown, the fishermen has been required to become increasingly adept at operating the depth finder. For example, the depth finder may have a plurality of ranges over which the depth of the body of water may be ascertained. The depth finder may also have a variety of sensitivity selections or functions which the operator needs to learn. Many of these functions have been enabled by the utilization of chip technology with small computers which are actually employed in the circuitry of the depth finders. Therefore, it is not uncommon for the fisherman to be overmatched when dealing with his particular depth finder, that is to say, the fisherman may have more equipment than he is able to handle while maintaining an interest in catching a fish. To this end, it has become apparent that the technical aspects of using a depth finder with its various sensitivity and automation features has reached the level where a need exists for a simplified depth finder which can perform all of the functions that a fisherman wishes to have performed.

SUMMARY OF THE INVENTION

It is an object of the present invention to provide a depth finder which will enable the sport fisherman to easily locate bottom features and suspended fish while fishing.

Yet another object of the invention is to provide a depth finder of the above type which is user friendly in that it will be able to assist the fisherman in the operation of the depth finder.

Yet another object of the invention is to provide a depth finder which can be used as a training device so that the fisherman may become acquainted with its various features prior to having to actually use the depth finder on a body of water as well as on the water.

Yet another object of the invention is to provide a depth finder which contains a built-in tutorial mode such that the depth finder may teach the fisherman how to use the depth finder providing written instruction for display on the depth finder along with indication illustrations for each command key.

Accordingly, these and other objects and features of my invention are provided in a novel combination of technology and ingenuity wherein a liquid crystal display depth finder using a sonar transducer is provided with a plurality of input keys interfaced to a microprocessor with each input key being dedicated to a particular function or feature usable with the depth finder. The microprocessor is utilized to control the operation of the transducer and the display of the data generated thereby in accordance with the particular function or set of functions chosen by the operator and to manipulate programming stored within the depth finder which will enable a tutorial mode such that instruction may be obtained by the user on the use of any of the features enabled by the control keys an so that he may determine how the machine is to properly function. The depth finder has a standard operational mode wherein it is capable of providing such information as a fish alarm which provides an audible alert when fish are detected, manual or automatic ranging to adjust the depth scale, selective monitoring of a specified depth of water or of a specified region of water proximal the bottom, manual or automatic sensitivity adjustment, illumination of the keypad, surface temperature, and the time and date. The display rate may also be varied, thus it may be seen that the depth finder is a somewhat complicated instrument. Accordingly, our invention utilizes the same input function keys and the control keys which are utilized to control each of the above described functions of the depth finder in a tutorial or demonstration mode, thereby allowing the fisherman to utilize the depth finder as a an instructional training device. To accomplish this aspect of the invention, we have provided a memory programmed to generate an artificial display on the screen which display can be controlled by utilization of the function keys on the depth finder. Associated with each function key on the depth finder and the display is information presented in graphic form which provides a textual explanation of the utilization of the particular function key. Thus the operator may at any time place the depth finder in the demonstration or tutorial mode and obtain assistance in utilizing the particular function key while either on the lake or other body of water or at home or on dry land. Thus the fisherman has no need to fumble with an instruction manual which may become soiled, wet or lost while he is trying to operate his depth finder and catch fish. Therefore the inherent frustration which accompanies the use of a technical device in what should be a relaxing setting is overcome by a very simple innovation which takes the guesswork and confusion out of operating a sophisticated depth finder.

BRIEF DESCRIPTION OF THE DRAWINGS

Apparatus embodying features of my invention are depicted in the accompanying drawings which form a portion of this invention and wherein.

DESCRIPTION OF A PREFERRED EMBODIMENT

Figure 1:
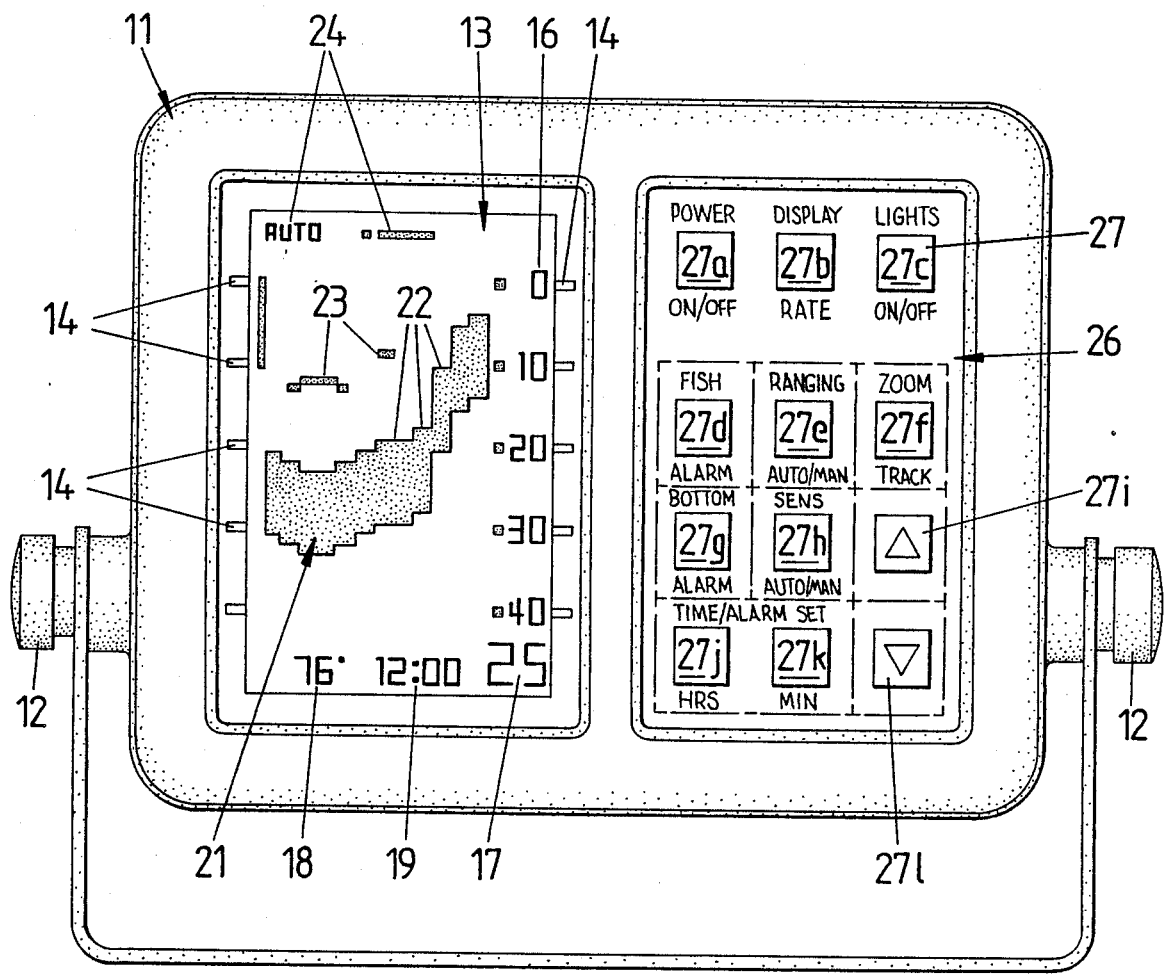
FIG. 1 is a pictorial representation of a depth finder embodying my invention showing the display face and input keyboard of the depth finder.
Figure 4:
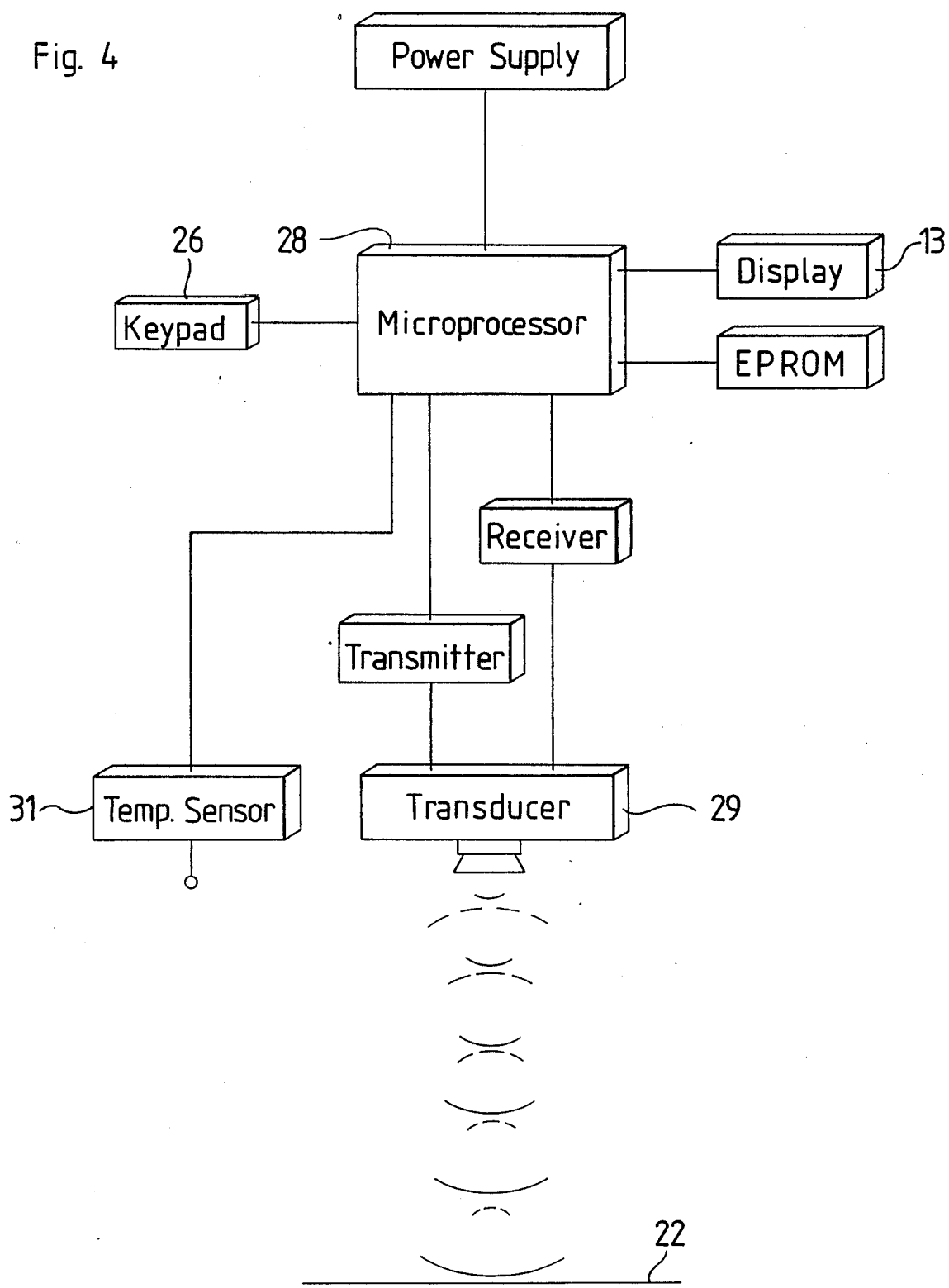
FIG. 4 is a simplified block diagram of the electronic circuitry which may be used in my depth finder.

Referring to FIG. 1, it may be seen that my depth finder includes a housing 11 which encases the electronic circuitry generally depicted in FIG. 4. The housing 11 has attached thereto a set of mounting and adjustment knobs which allow the depth finder to be mounted to the boat in a conventional manner and oriented as is convenient for the fisherman to observe the pictorial representation of the underwater scenario as shown on the display 13. The display 13 is a liquid crystal display of the latest technology which provides the highest degree of brightness in all light conditions and all viewing angles. The display is bordered by a permanent region whereon four horizontally disposed lines 14 are permanently fixed. These lines provide a constant reference against which may be presented various numeric indications of the depth of water being scanned by the depth finder. The display itself presents numeric indicators 16 which are positioned adjacent each of the lines 14. Thus the upper line may have the numeral 10 shown on the display screen adjacent thereto while the second, third and fourth lines may have the numeral 20, 30 and 40 respectively displayed on the display 14. Alternatively, other incremental depths such as 40, 60, 80 or 110, 130, 140 may be displayed adjacent the lines 14. In this manner, the display is able to provide an easily referenced indication of whether the pictorial representation covers the entire depth of water and illustrates what that depth may be or may indicate that the pictorial representation covers only a selected depth of water and indicates what that depth of water may be.

Also displayed on the liquid crystal display 13 immediately below the range numeric indicators 16 is a digital bottom indicator which digitally represents the depth of the bottom as determined by the depth finder at any particular moment. The display 13 may also indicate on its face a variable temperature display 18 which provides a Fahrenheit indication of the temperature of the water at the transducer and a clock display 19 which provides the current time. Of course the display would not be complete without a graph representation 21 of the bottom 22 of the body of water and any objects 23 which may be suspended above the bottom 22. Preferentially across the top of the display above the graph 21 is provided a plurality of function indicators 24 which inform the operator at a glance as to which functions are being utilized in generating the current display. The housing also includes a keypad indicated generally at 26 which allows the operator to control the functions of the depth finder or to select automatic operation of the depth finder. The keypad includes a plurality of individual keys 27, each of which is associated with a particular function of the depth finder or a particular control command to the depth finder. By way of example, in the illustration it may be seen that there are three keys 27 indicated across the upper right portion of the depth finder. These keys correspond to a power on/off key 27a, a display rate key 27b and a light on/off key 27c. The lower nine keys 27d-k provide input from the operator to the depth finder as to such features as the fish alarm, the ranging, bottom tracking, bottom alarm, sensitivity, the clock and controls such as increasing or decreasing any of the foregoing. As may be seen in FIG. 4, a microprocessor 28 operatively connected to the keypad 26 controls the display 13 and receives input not only from the keypad 26 but also from a transducer 29 and a temperature sensor 31.

Figure 2A:
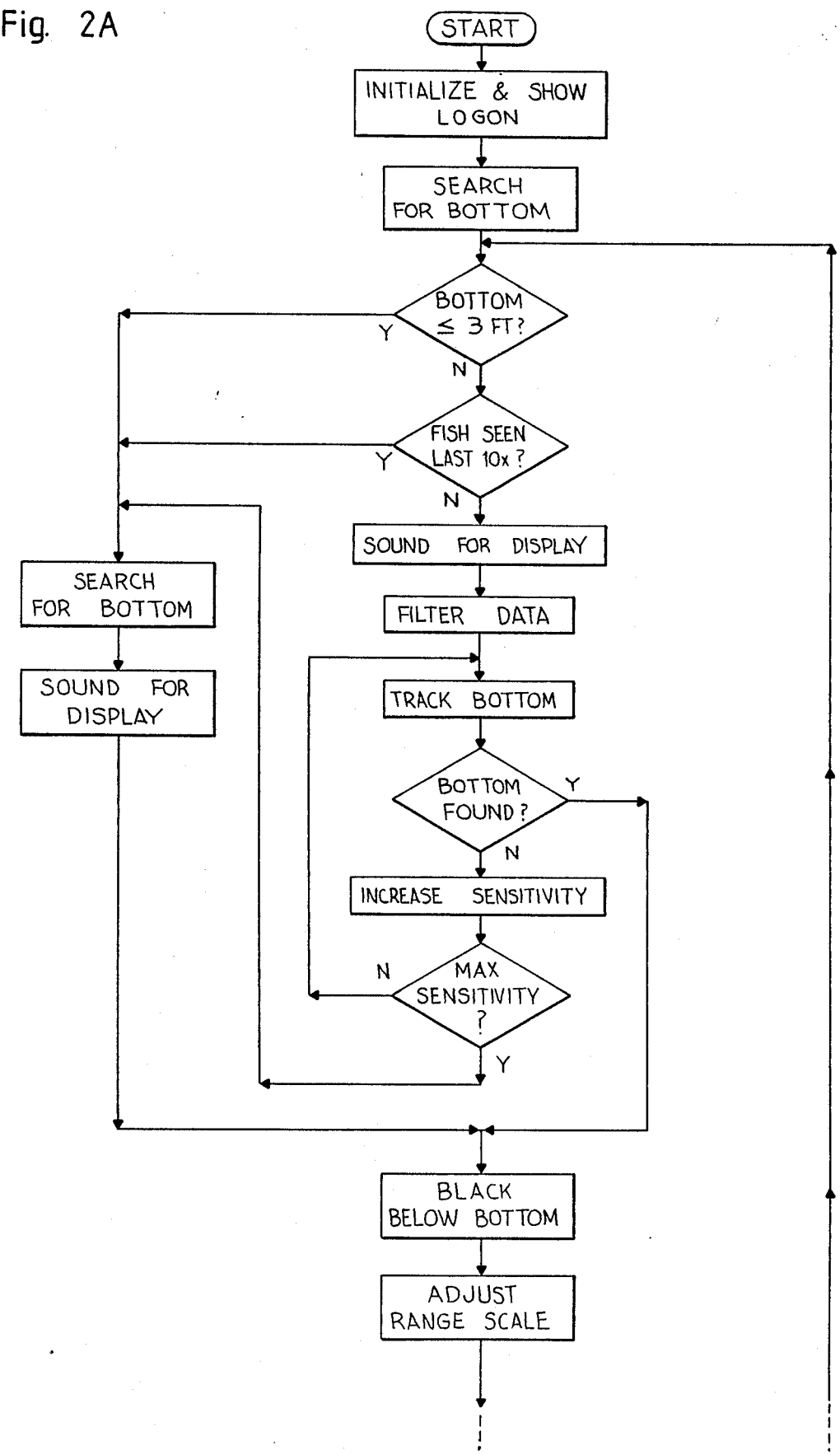
FIGS. 2a & 2b are a simplified version of a flow chart depicting the operation of the depth finder.
Figure 2B:
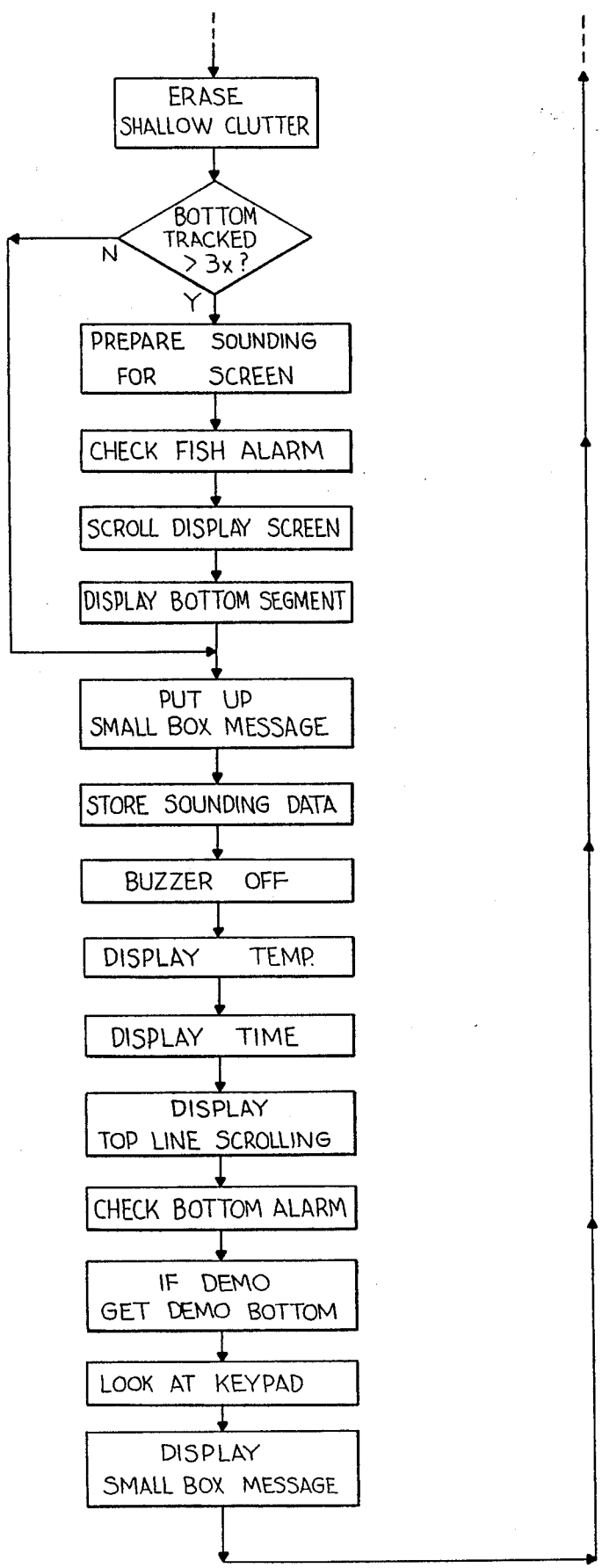
Figure 3:
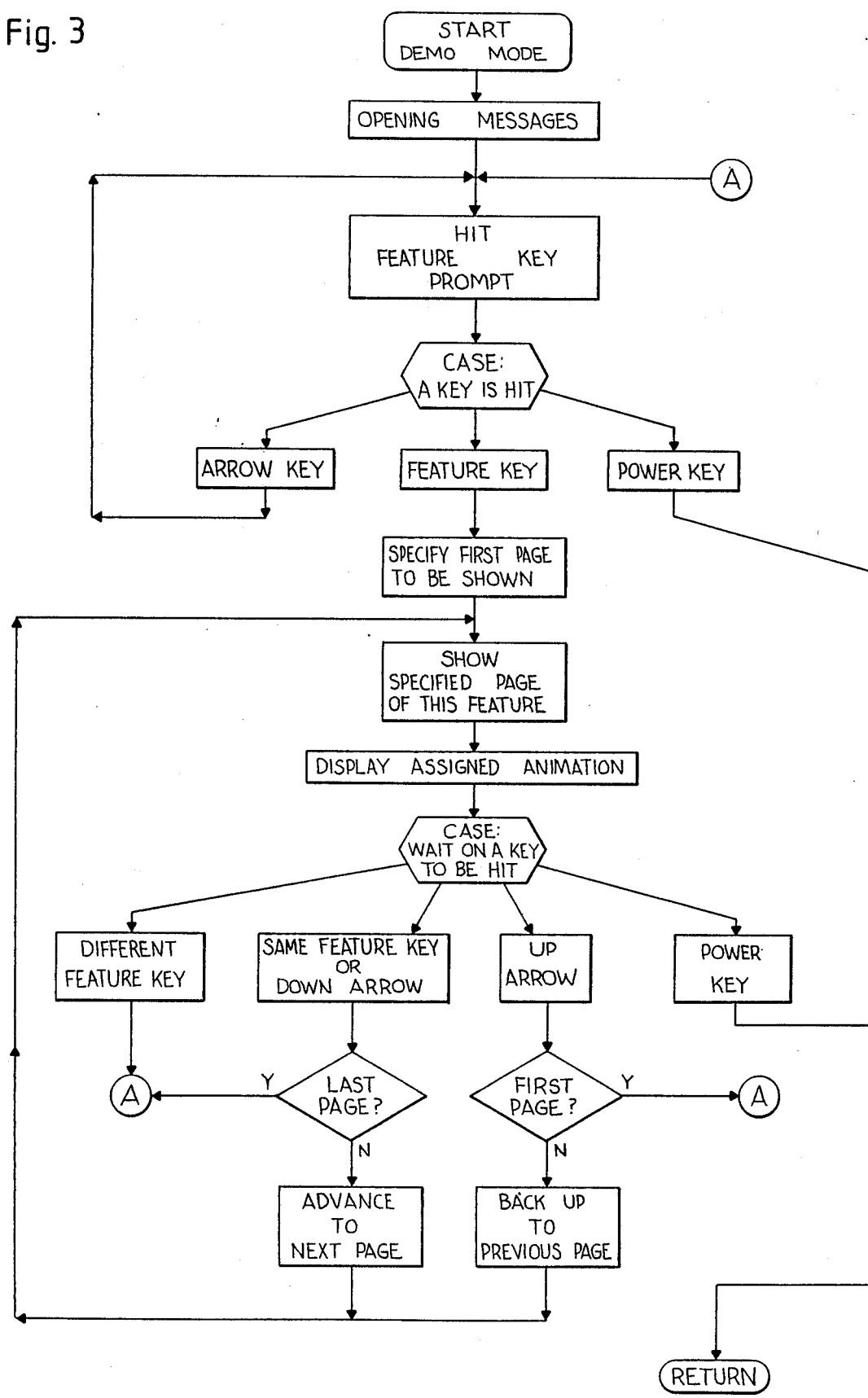
FIG. 3 is a simplified version of a flow chart showing the operation of the depth finder when in the tutorial mode.
Figure 5:
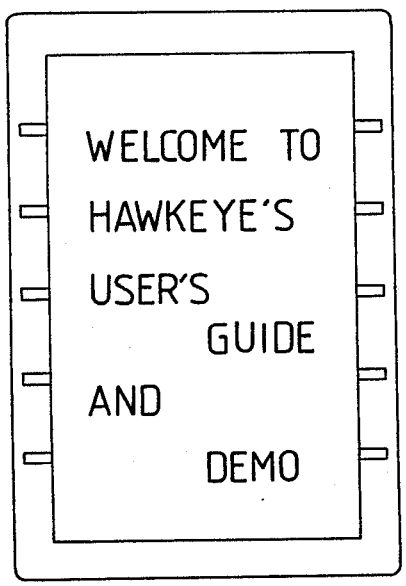
FIGS. 5-7 are pictorial representations of the display while in a tutorial mode.
Figure 6:
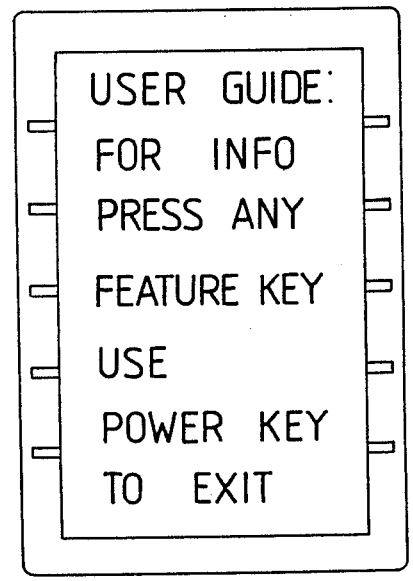
Figure 7:
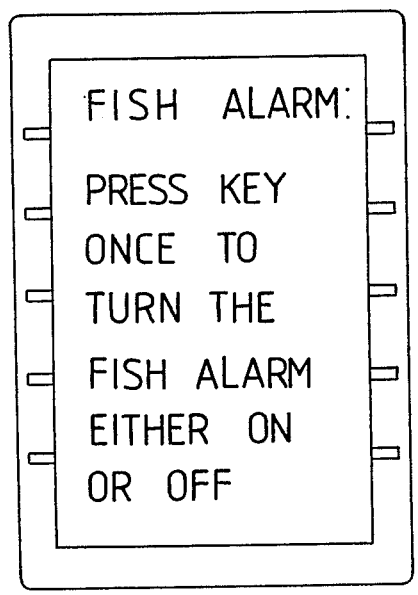

The microprocessor 28 has associated therewith various memory or storage devices which allowed the processor to access a set of commands to control its operation. Thus, in FIG. 2 the microprocessor 28 will perform a plurality of steps and poll each of its inputs in a specified order. The preferred order, as shown in FIGS. 2a and b is to initialize all parameters in accordance with a predetermined set of conditions and then begin a bottom search. As may be seen, if the bottom is not found, a small box message will be displayed stating that the bottom is not found. The entire sequence below the search for bottom box and the top of FIG. 1a is iteratively performed at a rate determined by the process of selection and the circuitry associated therewith as is well known in the art. Note that near the bottom of the flow chart shown in FIG. 2 the microprocessor has a command which says "if demo, get demo bottom" followed by a command "look at keypad". If the arrow keys are hit simultaneously, the microprocessor is placed in the demo mode and information stored in the memory devices associated with the microprocessor can be retrieved to generate an artificial display on display 13 or textual matter associated with the function keys. If the tutorial is selected, the flow chart shown in FIG. 3 represents the sequence of events which allow the depth finder to interface with the user. The first page of information displayed on the display 13 when the demonstration mode and tutorial mode is called up, is shown in FIG. 5. In the tutorial mode, the screen presents a prompt, as in FIG. 6, to the user to press one of the feature keys 27d-k. If the power key is hit again, the fish finder returns to its normal operating mode and continues the iteration shown in the flow chart in FIG. 2. However if a feature key is hit, then a message is retrieved from memory and displayed on the display 13 as in FIG. 7 to familiarize the user with the operation of the feature key. Animation may also be provided such that the function indication associated with the control keys may change; for example range scale may change, the digital bottom indicator may change, the temperature display may change, the bar graph 21 may change. If the operator then hits another key 27 the microprocessor will provide the user with further information if the same is available or will return the user to the main menu such that another feature key may be selected for tutorial assistance therewith.

From the foregoing it may be seen that the depth finder allows the fisherman to refresh himself on the capabilities of the depth finder while on the water. For example, if the fisherman normally uses the depth finder in the bottom tracking mode, but decides he wishes to look at a different layer of water, he may go to the user's guide to check on how the machine functions in that mode prior to selecting the mode. Thus, all he has to do to ensure proper operation is to enable the user's guide and push the key corresponding to the function he desires. The machine will then display the information needed for him to properly use this function of the device. He can then return to the operational mode and utilize the information which he has reviewed.

While I have shown my invention in one form, it will be obvious to those skilled in the art that it is not so limited but is susceptible of various changes and modifications without departing from the spirit thereof.

What I claim is:

1. A depth finder for use on a boat to locate underwater structure and fish using reflected sonic energy comprising:
   (a) transmitter means for generating repetitive signals;
   (b) transducer means for converting said signals into sonic energy and directing said energy into a body of water such that reflected sonic energy incident on said transducer means is converted into a reflected energy signal;
   (c) receiver means for receiving said reflected energy signal;
   (d) programmable computer means operatively connected to said transmitter means and said receiver means to receive electronic information therefrom and to provide control signals thereto in accordance with a plurality of operating modes programmed within said programmable computer means;
   (e) display means operatively connected to said programmable computer means for displaying visual graphic representations corresponding to said reflected energy signal;
   (f) manually operable input means for providing command signals to said programmable computer means; and
   (g) means associated with said programmable computer means for providing a tutorial display on said display means to explain the proper operation of said depth finder, said means being interactive with said input means and said programmable computer means to display instructional information stored therein responsive to manual operation of said input means.

2. Apparatus as defined in claim 1 wherein said input means is a keypad having discrete keys for each of a number of predetermined variables and for additional control functions.

3. Apparatus as defined in claim 2 including a control key for a bottom alarm variable; a control key for a ranging variable; and a control key for a depth bracket variable.

4. Apparatus as defined in claim 2 wherein said display means comprises an LCD screen having a fixed border thereabout, said border providing a plurality of fixed indicia and said LCD providing selected depth indicia adjacent said fixed indicia in accordance with signals provided from said data processing means.

5. Apparatus as defined in claim 1 wherein said means for providing a simulated graphic display comprises an electronic read only memory operatively connected to said programmable computer means and having an executable program stored therein which is executable on command input via said input means to present on said display means a selected representation of imagery associated with predetermined operating parameters of said apparatus.

6. Apparatus as defined in claim 5 wherein said input means is a keypad including a plurality of keys for controlling or modifying the operation of said apparatus.

7. A depth finder for locating underwater structure and fish from a floating platform by directing sonic energy downwater into a subjacent body of water comprising:
   (a) electronic means for generating and receiving a series of identifiable repetitive sonic signals;
   (b) programmable computer means operatively connected to said electronic means to receive data therefrom relative to said sonic signals, said programmable computer means programmed to utilize said data to generate electronic signals representative of underwater structure and fish in a live operating mode;
   (c) programmable memory means for use in an interactive tutorial mode of operation wherein an operator is provided with instruction on the operation of said depth finder;
   (d) display means operatively connected to said programmable computer means to receive electronic signals and provide a visual display in accordance therewith; and
   (e) input means operatively connected to said programmable controller to allow an operator provide control messages thereto to select the mode of operation of said depth finder and to interactively control said operation.

8. Apparatus as defined in claim 7 wherein said input means comprises a keypad operatively connected to said programmable computer means to selectively control operation of said depth finder, to vary the visual display provided by said display means in each of said modes of operation; and to selectively activate any of a plurality of operating options for said programmable computer means.

9. Apparatus as defined in claim 8 wherein said display means comprises an LCD display wherein said electronic signals are display graphically.

10. Apparatus as defined in claim 9 wherein a portion of said LCD display is utilized to present information indicating the selected operating options.

* * * * *